(12) United States Patent
Li et al.

(10) Patent No.: US 8,384,662 B2
(45) Date of Patent: Feb. 26, 2013

(54) DISPLAY DEVICE AND ICON DISPLAY METHOD THEREFOR

(75) Inventors: Xiao-Guang Li, Shenzhen (CN); Xin Zhao, Shenzhen (CN); Te-Yuan Kung, Taipei Hsien (TW); Kuan-Hong Hsieh, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 866 days.

(21) Appl. No.: 12/541,173

(22) Filed: Aug. 14, 2009

(65) Prior Publication Data
US 2010/0302146 A1    Dec. 2, 2010

(30) Foreign Application Priority Data

May 26, 2009   (CN) .......................... 2009 1 0302635

(51) Int. Cl.
*G09G 5/00* (2006.01)
(52) U.S. Cl. .......................... 345/156; 345/173; 715/700
(58) Field of Classification Search .......... 345/156–173, 345/204; 715/700
See application file for complete search history.

(56) References Cited

U.S. PATENT DOCUMENTS

| | | | |
|---|---|---|---|
| 2002/0003534 A1* | 1/2002 | Hayashi et al. ............... | 345/204 |
| 2006/0075355 A1* | 4/2006 | Shiono et al. ................ | 715/778 |
| 2007/0094620 A1* | 4/2007 | Park .............................. | 715/862 |
| 2007/0124697 A1* | 5/2007 | Dongelmans ................ | 715/805 |
| 2007/0130545 A1* | 6/2007 | Mochizuki et al. ........... | 715/837 |
| 2009/0092336 A1* | 4/2009 | Tsurumi ....................... | 382/294 |

FOREIGN PATENT DOCUMENTS

CN    1938674    3/2007

* cited by examiner

*Primary Examiner* — Viet Pham
(74) *Attorney, Agent, or Firm* — Altis Law Group, Inc.

(57) ABSTRACT

A display device is provided. The display device includes an input unit, a display unit, a storage unit, and a processing unit. The input unit it for generating input signals in response to user input. The display unit is for displaying interfaces with a plurality of icons. The storage unit is for storing a movement track and a speed of each icon. The processing unit is for selecting an icon in response to an input signal from the input unit, acquiring a movement track and a speed of the icon from the storage unit, controlling the icon to move at the speed along the movement track and the display unit to display a movement of the icon, and performing a function associated with the icon.

6 Claims, 5 Drawing Sheets

DISPLAY DEVICE AND ICON DISPLAY METHOD THEREFOR

BACKGROUND

1. Technical Field

The disclosure relates to display devices and, more particularly, to a display device and an icon display method adapted for the display device.

2. Description of the Related Art

When there are icons displayed on a screen of a display device, a user may operate a key or a touch input to select an icon and the display device performs a function corresponding to the icon. When an icon responds to an input operation, the display device controls the icon to change based on a predetermined manner to notify the user that a function is being performed, such as the icon becomes bigger and changes color. However, the predetermined manner is not very entertaining.

BRIEF DESCRIPTION OF THE DRAWINGS

The components in the drawings are not necessarily drawn to scale, the emphasis instead being placed upon clearly illustrating the principles of the display device. Moreover, in the drawings, like reference numerals designate corresponding parts throughout the several views.

DETAILED DESCRIPTION

Figure 1:
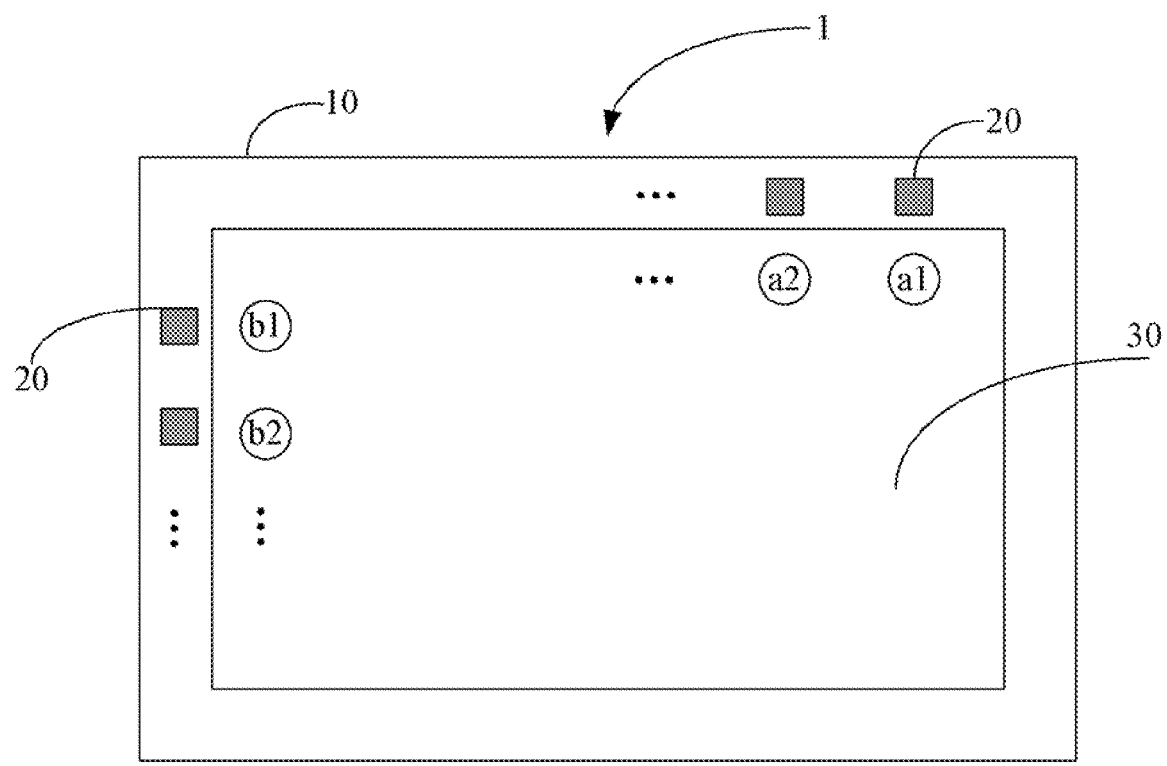
FIG. 1 is a schematic view of a user interface of a display device in accordance with an embodiment.

FIG. 1 is a schematic view of a user interface of a display device in accordance with an embodiment. The display device 1 may be a digital photo frame, or an e-book, etc. The display device 1 includes a frame 10, keys 20 on the frame 10 along the periphery thereof, and a screen 30. The screen 30 is configured for displaying icons and contents. There are a plurality of icons displayed on one user interface of the screen 30. In this embodiment, icons of a first group are aligned horizontally on the screen 30, such as a1 and a2. Icons of a second group are aligned vertically on the screen 30, such as b1 and b2.

Figure 2:
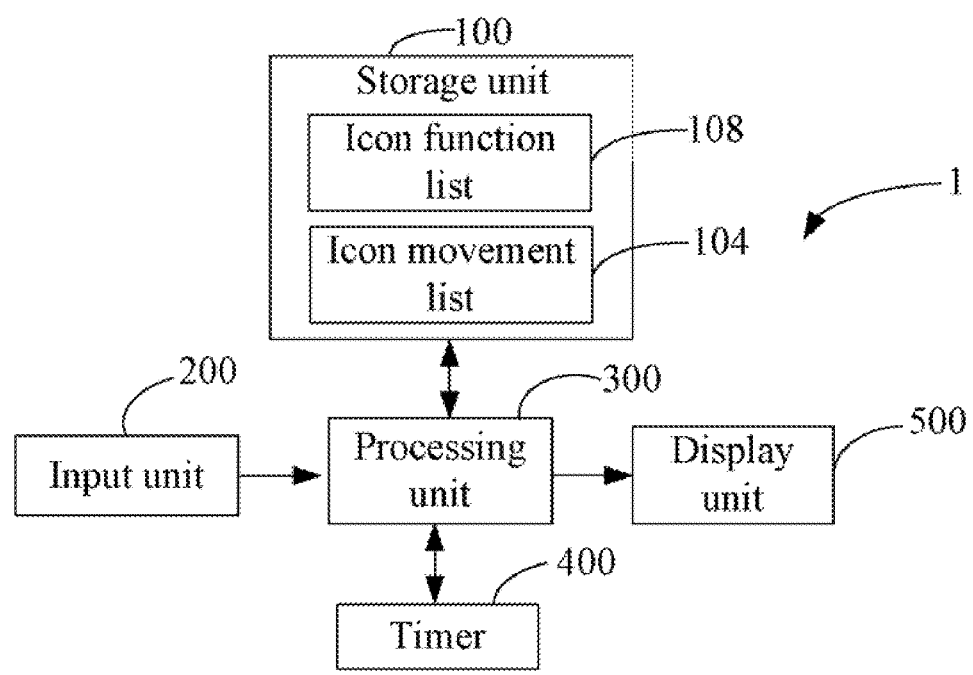
FIG. 2 is a block diagram of the display device of FIG. 1 in accordance with an embodiment.
Figure 3:
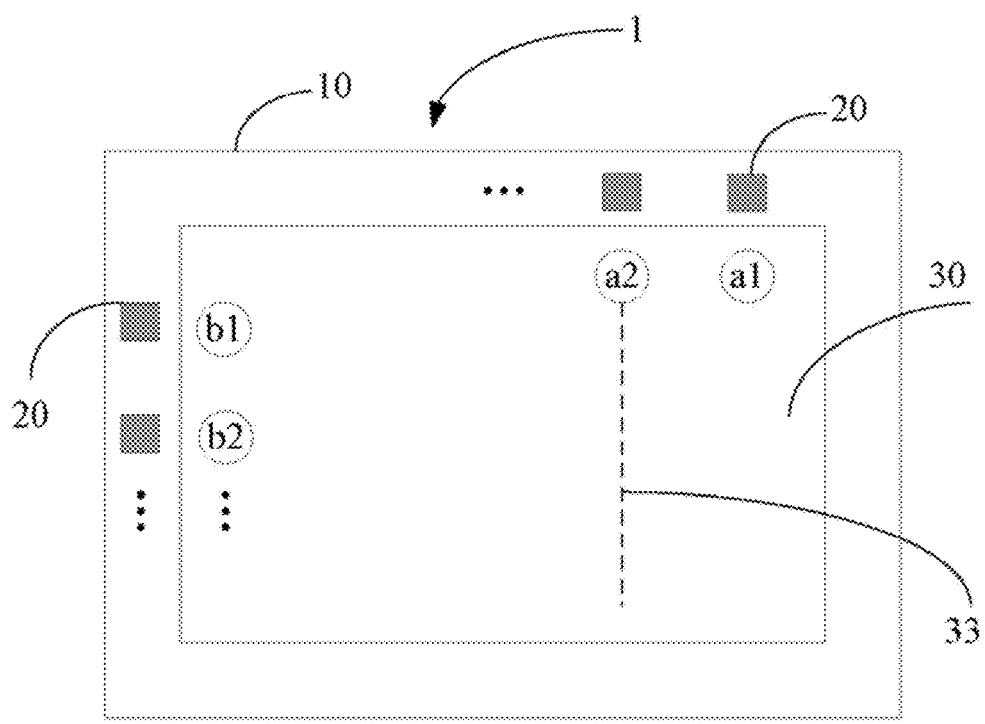
FIG. 3 is a first schematic view of an icon movement of the display device of FIG. 1 in accordance with an embodiment.
Figure 4:
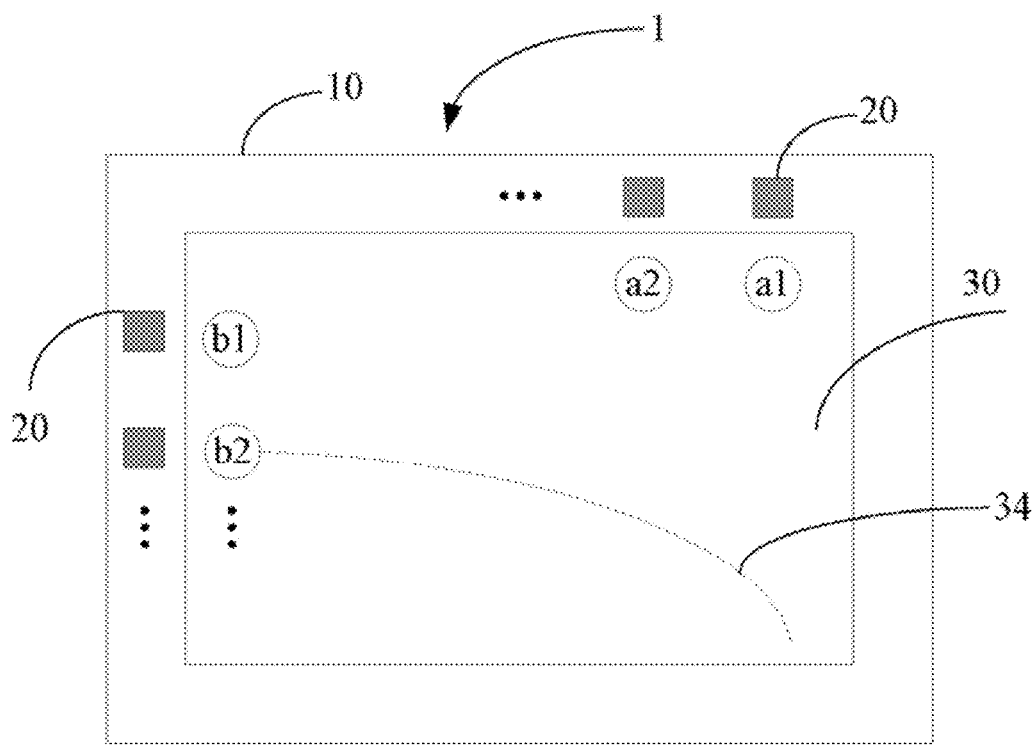
FIG. 4 is a second schematic view of an icon movement of the display device of FIG. 1 in accordance with an embodiment.

FIG. 2 is a block diagram of the display device of FIG. 1 in accordance with an embodiment. The display device 1 includes a storage unit 100, an input unit 200, a processing unit 300, a timer 400, and a display unit 500. The storage unit 100 stores an icon movement list 104 and an icon function list 108. The icon movement list 104 stores a movement parameter of each icon. The movement parameter includes a movement track, a speed, and a movement time. As shown in FIG. 3, the movement track 33 of each icon of the first group icons, which are aligned horizontally on the screen 30, is a straight line vertical to the horizontal direction. As shown in FIG. 4, the movement track 34 of each icon of the second group icons, which are aligned vertically on the screen 30, is a curved line along a direction vertical to the vertical direction.

| Icon movement list | | | |
|---|---|---|---|
| Icon | Movement track | Speed | Movement time |
| a1 | Line | $v_{a1}$ | $t_{a1}$ |
| ... | ... | ... | ... |
| b1 | Curve | $v_{b1}$ | $t_{b1}$ |
| ... | ... | ... | ... |

The icon movement list 104 includes an icon column, a movement track column, a speed column, and a movement time column. The icon column lists a plurality of icons, such a1 and b1. The movement track column lists a movement track of each icon. The movement track may be a straight line, a curved line, etc. In this embodiment, horizontal icons of the screen 30 are associated with a straight line movement track, such as a1 and a2. As shown in FIG. 3, the movement track of a1 icon is a straight line (shown as a dotted line). Vertical icons of the screen 30 are associated with a curved line movement track, such as b1 and b2. As shown in FIG. 4, the movement track of b1 icon is a curved line (shown as a curved dotted line).

The speed column lists a speed of each icon on a corresponding movement track. For example, the speed of a1 icon is $v_{a1}$ on the straight line track and the speed of b1 icon is $v_{b1}$ on the curved line track. The movement time column lists a movement time of each icon. For example, the movement time of a1 icon is $t_{a1}$ on the straight line track and the movement time of b1 icon is $t_{b1}$ on the curved line track.

The icon function list 108 lists each icon and an associated function. The icon function list 108 includes an icon column and a function column. The icon column lists the icons. The function column lists the associated functions of the icons, such as playing music and sharing photos. For example, when the a1 icon is selected, the display device 1 will perform an A1 function.

| Icon function list | |
|---|---|
| Icon | Function |
| a1 | A1 function |
| ... | ... |
| b1 | B1 function |
| ... | ... |

The input unit 200 is configured for generating input signals in response to user input. The input unit 200 may be, for example, a key-input unit, or a touch-input unit. The processing unit 300 is configured for selecting an icon when the input unit 200 generates an input signal, acquiring the movement parameter of the icon from the storage unit 100, and controlling the icon to move at a corresponding speed along a corresponding track and the display unit 500 to display the movement of the icon. The timer 400 is configured for timing when the icon begins to move and stopping timing when an elapsed time reaches the movement time of the icon in the icon movement list 104. The processing unit 300 is further configured for acquiring an association function from the icon function list 108 and performing the function associated with the icon.

Figure 5:
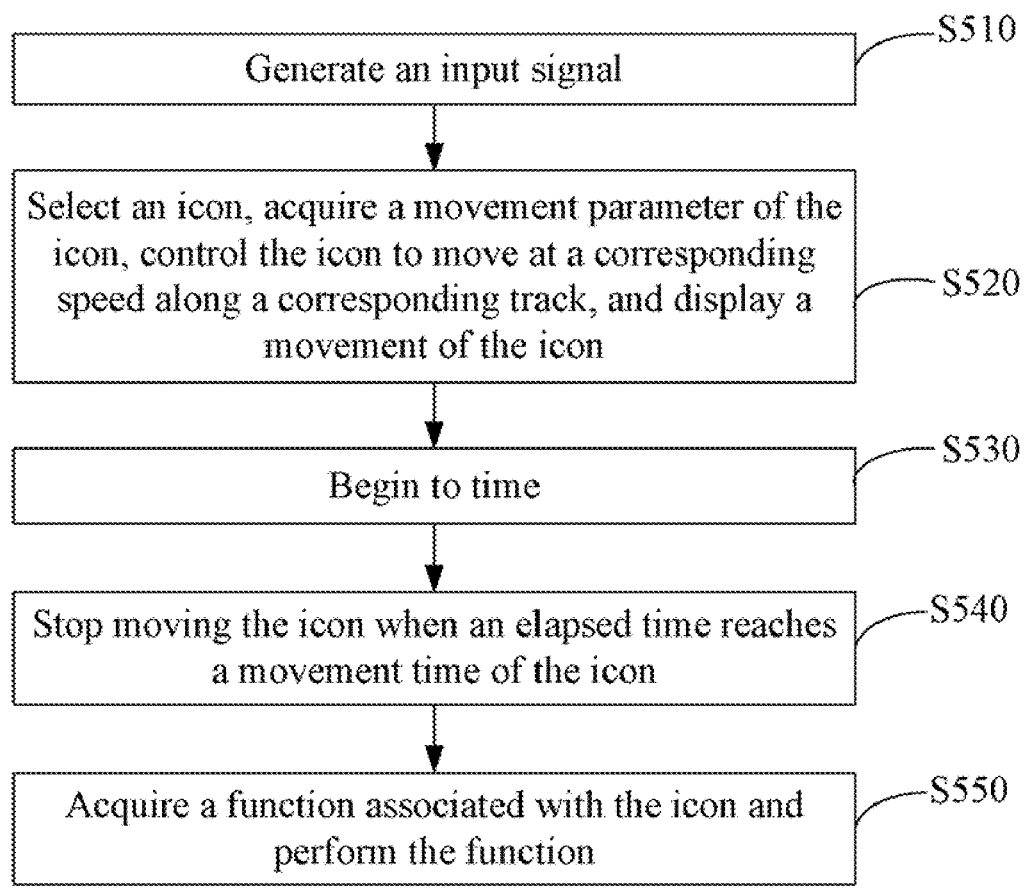
FIG. 5 is a flowchart of a method for displaying an icon implemented by the display device of FIG. 4 in accordance with an embodiment.

FIG. 5 is a flowchart of a method for displaying an icon implemented by the display device of FIG. 4 in accordance with an embodiment. In step S510, the input unit 200 generates an input signal in response to user input. In step S520, the processing unit 300 selects an icon in response to the input signal from the input unit 200, acquires a movement parameter of the icon from the icon movement list 104, controls the icon to move at a corresponding speed along a corresponding track, and controls the display unit 500 to display a movement of the icon. In step S530, the timer 400 begins to time. When an elapsed time of the timer 400 reaches a movement time of the icon in the icon movement list 104, in step S540, the processing unit 300 stops moving the icon. In step S550, the processing unit 300 acquires an associated function from the icon function list 108 and performs the function associated with the icon.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A display device comprising:
an input unit, for generating input signals in response to user input;
a display unit, for displaying interfaces with a plurality of icons comprising a first group of icons which are aligned horizontally and a second group of icons which are aligned vertically;
a storage unit, for storing a movement track and a speed of each icon, wherein the movement track of each icon of the first group of icons is a straight line vertical to the horizontal direction and the movement track of each icon of the second group of icons is a curved line along a direction vertical to the vertical direction; and
a processing unit, for selecting an icon in response to an input signal from the input unit, acquiring the movement track and the speed of the icon from the storage unit, controlling the icon to move at the speed along the movement track and the display unit to display a movement of the icon, and performing a function associated with the icon.

2. The display device as recited in claim 1, wherein the storage unit is further for storing a movement time of each icon, and the display device further comprises a timer for timing when an icon begins to move and stopping timing when an elapsed time reaches the movement time of the icon.

3. The display device as recited in claim 1, wherein the storage unit is further storing an icon function list for recording associated functions of the icons, and the processing unit is further for acquiring a function associated with the icon from the icon function list.

4. A method for displaying an icon of a display device, wherein the display device displays a first group of icons which are aligned horizontally and a second group of icons which are aligned vertically, comprising:
storing a movement track and a speed of each icon, wherein the movement track of each icon of the first group of icons is a straight line vertical to the horizontal direction and the movement track of each icon of the second group of icons is a curved line along a direction vertical to the vertical direction;
generating an input signal;
selecting an icon in response to the input signal, acquiring the movement track and the speed of the icon, controlling the icon to move at the speed along the movement track and display a movement of the icon; and
performing a function associated with the icon.

5. The method as recited in claim 4, further comprising:
storing a movement time of the icon; and
beginning to time when the icon begins to move and stopping timing when an elapsed time reaches the movement time of the icon.

6. The method as recited in claim 4, further comprising:
storing an icon function list for recording an associated function of the icon; and
acquiring the function associated with the icon from the icon function list.

\* \* \* \* \*